March 5, 1968  J. W. MAYFIELD  3,371,565

PIPE CUTTING AND BEVELING DEVICE

Filed Feb. 2, 1966

INVENTOR.
JOHNNY W. MAYFIELD

BY Kimmel, Crowell & Weaver
ATTORNEYS.

United States Patent Office 3,371,565
Patented Mar. 5, 1968

3,371,565
PIPE CUTTING AND BEVELING DEVICE
Johnny W. Mayfield, 617 Main Ave.,
Sacramento, Calif. 95838
Filed Feb. 2, 1966, Ser. No. 524,446
8 Claims. (Cl. 82—4)

ABSTRACT OF THE DISCLOSURE

A hand operated tool including an open frame having portions thereof disposed in confronting spaced relation relative to an elongated conduit mounted for rotation about its longitudinal axis, a conduit cutting blade mounted on the frame, means on the frame engaging the conduit and being operable to move and force the cutting blade through the conduit in a direction substantially perpendicular to the longitudinal axis thereof, a beveling knife on the frame, said beveling knife being mounted on the frame in lagging relationship relative to the cutting wheel and being coplanar therewith, the beveling knife being engageable with the conduit within the cut formed by the cutting blade, and means on the frame cooperating with the beveling knife to move, selectively, the beveling knife in directions substantially perpendicular and parallel to the longitudinal axis of the conduit to effect a bevel at the severed ends of the conduit and without forming an internal burr of appreciable size as the beveling tool follows the cutting wheel inwardly relative to the longitudinal axis of the conduit.

---

This invention relates to a pipe cutting and beveling device, and more particularly to a device by means of which a tubular conduit may be severed by deformably working a limited circumferential portion thereof with a cutting wheel means being provided for simultaneously shaving an appropriate bevel on the edge formed by the cutting wheel.

As conducive to a clearer understanding of this invention, it may here be pointed out that pipe cutting tools are known in the prior art and usually comprise a smooth or non-toothed cutting wheel which is rotated with respect to a tubular conduit to cold work a limited circumferential area thereby decreasing the thickness of the pipe wall until the pipe is severed into two pieces. This operation is often called cutting, but it should be pointed out that no cuttings or shavings result therefrom since the wheel, in effect, mashes the conduit along a limited area to sever it into two pieces. The term "cutting" hereinafter refers to a severing process wherein the conduit is cold worked without the production of shavings or cuttings. As distinguished from cutting, the term "shaving" will be utilized to designate the process wherein the work piece is sliced thereby producing a shaving or a cutting.

Non-threaded mill pipe is customarily beveled at a 37° angle so that when equally sized joints are aligned for welding a circumferential V-shaped groove is formed to receive the welding bead. This bevel angle has been found to be the most efficient in practice for receiving the bead, thus creating a welded joint of maximum strength. One difficulty with pipe cutters of the prior art is that while a crude bevel angle is formed by the cold working operation the angle thereof is generally substantially less than the 37° bevel angle of mill pipe. The normal 37° bevel angle cannot be created by prior art cutting tools because of the necessary limitations on the cold working area. Even when utilizing a very thin cutting wheel, the interior diameter of the pipe at the newly severed end is slightly less than the internal diameter of mill pipe because of the cold working process. This latter disadvantage is normally corrected by utilizing an internal ream to remove the area of decreased internal diameter which is called a burr.

An important object of the instant invention is therefore to provide a pipe cutting and beveling device which will sever a joint of pipe to form a segment of desired length and at the same time produce a finished conduit section having a beveled edge inclined at the desired angle.

Another object of the instant invention is to provide a pipe cutting and beveling machine in which a rotatable wheel is utilized to cut the pipe into two segments in conjunction with a beveling knife to create the appropriate bevel angle and reduce the extent of the burr formed by the cutting wheel.

Still another object of the instant invention is to provide a pipe cutting and beveling machine which includes a rotatable wheel and a bevel knife, the latter being adjustably mounted for movement toward the work piece to insure an appropriate relationship between the cutting wheel and the bevel knife.

A further object of the instant invention is to provide such a pipe cutting and beveling device wherein the knife is mounted for movement along a path parallel to the longitudinal axis of the pipe to insure correct relationship between the cutting wheel and the bevel knife.

A still further object of the instant invention is to provide a hand manipulatable pipe cutting and beveling device which may be utilized with a machine for rotating the work piece and which is constructed to accommodate pipe segments of varying sizes.

Other objects and advantages of the instant invention reside in the combinations of elements, arrangements of parts and features of construction and operation, all as will be more fully pointed out hereinafter and disclosed in the accompanying drawing wherein there is shown a preferred embodiment of this inventive concept.

Figure 1:
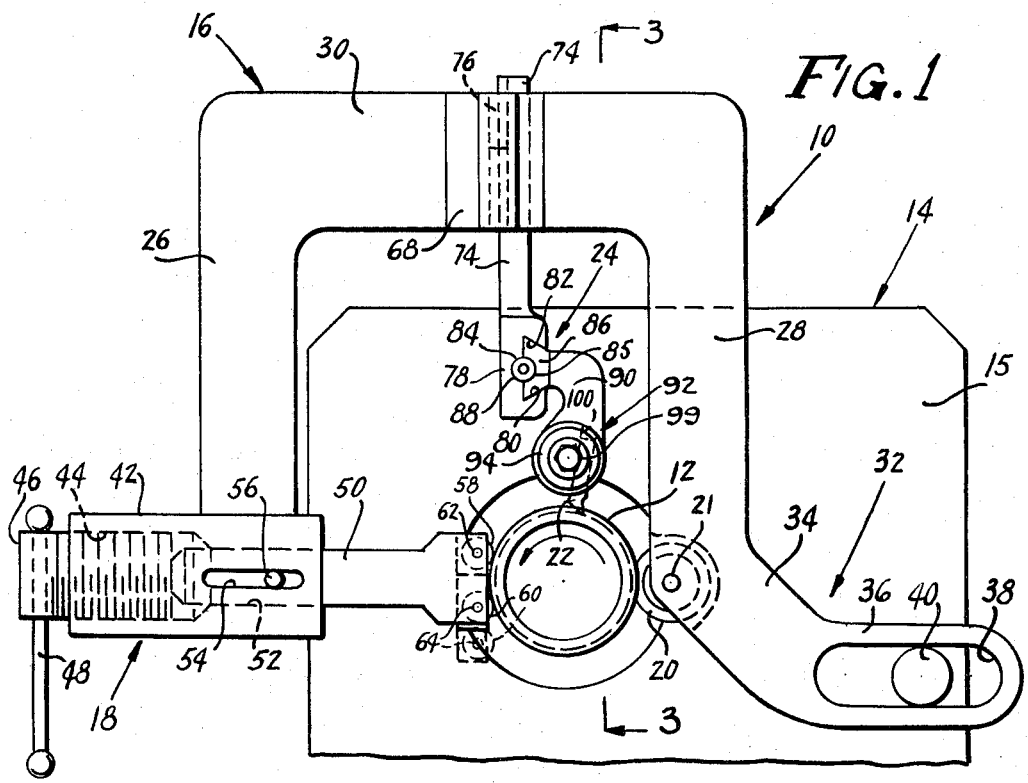
FIGURE 1 is a front elevational view of one form of pipe cutting and beveling device constructed in accordance with the instant invention, mounted in association with a rotatable tubular conduit and means for rotating the conduit.

Referring now to the drawing in detail, wherein like reference characters designate like elements throughout the several views, there is indicated generally at 10 a pipe cutting and beveling device in accordance with the instant inventive concept associated with a tubular conduit 12 which is revolved about its longitudinal axis by the head 15 of a pipe rotating means shown generally at 14. Rotating means 14 may be of any desired type, but is illustrated as the driving mechanism of a threading machine, although it should be understood that no threads are formed on pipe 12 by the utilization of the device of the instant invention. Pipe cutting and beveling machine 10 has as its major components a U-shaped frame shown generally at 16 on one leg of which is positioned a selectively advanceable means shown generally at 18 for engaging and holding one side of pipe 12 against lateral movement to the left with a turning wheel 20 being rotatably mounted on a stub axle 21 on the other leg of frame 16 opposite from engaging and holding means 18. Pipe cutting and beveling machine 10 is of the hand-held variety and includes a beveling knife 22 secured by an adjustable connecting means, shown generally at 24, to frame 16.

As will become more fully apparent as the description of the instant invention proceeds, pipe 12 is held between engaging means 18 and cutting wheel 20 with engaging means 18 being adjusted to increase the pressure between pipe 12 and wheel 20 to cut pipe 12 in substantially the same manner that prior art pipe cutters perform the same operation. Cutting wheel 20 is utilized to begin the severing of pipe 12 into its two segments prior to the start of the beveling operation by knife 22. In other words, connecting means 24 is so adjusted that beveling knife 22 is spaced from pipe 12 until wheel 20 has cut through a portion of the outer periphery of pipe 12. After the cut has been started, connecting means 24 is adjusted to engage beveling knife 22 with the cut formed by wheel 20 with both engaging and holding means 18 and connecting means 24 being adjusted to complete the cut and the bevel.

As may be seen most clearly in FIGURE 1, frame 16 includes a pair of substantially parallel legs 26, 28 connected by a bight 30 and a handle-like member 32 integral with or secured to leg 28. Cutting wheel 20 is located at the junction of leg 28 and handle-like member 32, which includes an outwardly extending diagonal segment 34 and an outwardly extending horizontal segment 36, the latter defining an elongate slot 38 which receives a pin 40 extending outwardly from head 15. It will be apparent that the co-action of slot 38 and pin 40 will tend to retain cutting wheel 20 in a substantially vertical plane with respect to pipe 12 and give pipe cutting and beveling device 10 a degree of stability normally not found in a hand-held implement. It will also be apparent that slot 38 will permit lateral movement between frame 16 and pin 14 enabling the pipe cutting and beveling device 10 to cut and bevel various sizes of pipe.

Engaging and holding means 18 includes a rectangular housing 42 perpendicularly affixed to the lower end of leg 26 and extending toward pipe 12 and cutting wheel 20. Housing 42 includes tubular bore 43 internally threaded at 44 for the reception of a threaded cylindrical plug 46 having a handle 48. Rotation of handle 48 advances or retracts plug 46 to permit linear movement of a rectangular plug 50 reciprocably mounted in a rectangular opening 52 communicating with bore 43 and extending through housing 42. Plug 50 is of a cross-sectional area less than the diameter of bore 43, which receives, when plug 46 is retracted, the end of plug 50.

A pair of straight slots 54 extend through housing 42 and receive a pair of pins 56 secured to plug 50 permitting limited perpendicular movement of plug 50 relative to leg 26 of frame 16. On the end of cylindrical plug 50 is a pair of rollers 58, 60 mounted on pins 62, 64 respectively for engaging and holding one side of pipe 12 against lateral movement toward engaging and holding means 18. It is thus apparent that the rotation of handle 48 advances plug 46 and consequently plug 50 to increase the pressure between pipe 12 and cutting wheel 20. The pressure emitted by continued rotation of handle 48 will result in the deformation of the metallic wall of pipe 12 to sever the same as previously described.

In order to accommodate larger pipe sizes, at least one of rollers 58, 60 is mounted for movement in a vertical plane, as illustrated in dashed lines in FIGURE 1, to receive the larger diameter pipe. Any conventional means (not shown) may be provided, such as a screw adjusted bracket, for effecting the movement of the desired wheel.

Figure 2:
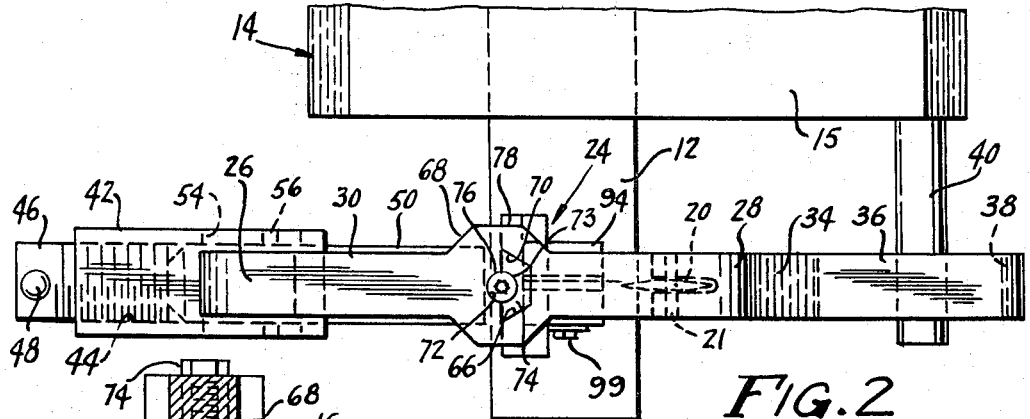
FIGURE 2 is a partial top plan view of the structure of FIGURE 1 illustrating the interconnection between the pipe cutting and beveling device, the rotatable work piece and the rotating means.

As may be seen most clearly in FIGURE 2, connecting means 24 is affixed to frame 16 through an opening 66 formed in an enlargement 68 in bight 30. Opening 66 includes a trapezoidal section 70 communicating with a semi-circular internally threaded section 72, a complementarily formed shank 74 being reciprocably received in trapezoidal section 70. A screw 76 is positioned in semi-circular section 72 and registers with an aligned semicircular internally threaded opening 73 in shank 74 so that the rotation of screw 76 advances or retracts trapezoidal shank 74 to effect linear movement of beveling knife 22 toward and away from conduit 12.

Figure 3:
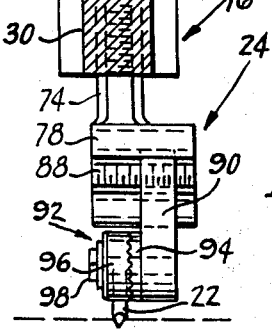
FIGURE 3 is a vertical cross-sectional view of the pipe cutting and beveling device of the instant invention taken substantially along line 3—3 of FIGURE 1 as viewed in the direction of the arrows.

As may be seen most clearly in FIGURES 1 and 3, an enlargement 78 is positioned on the lower end of shank 74 which includes a transverse opening 80 having a trapezoidal section 82 and a semi-circular internally threaded offset section 84, a trapezoidal shank 86 being linearly movable in section 82. A screw 88 is journaled in semi-circular section 84 and registers with a semi-circular internally threaded opening 85 in trapezoidal shank 86. Trapezoidal shank 86 is secured to an L-shaped arm 90 which in turn carries a blade angling device shown generally at 92. Rotation of screw 88 will obviously move blade angling device 92 and cutting knife 22 in a direction parallel to the longitudinal axis of conduit 12.

Blade angling device 92 includes, as best shown in FIGURES 1 and 3, a fixed cylindrical section 94 having a threaded bore therein affixed to arm 90 and a rotatable cylindrical section 96 having a smooth bore aligned with the threaded bore of section 94 with a handset screw 98 extending through both bores for releasably securing the sections together. A plurality of meshing teeth are formed on the confronting faces of cylindrical sections 94, 96 so that tightening of screw 98 secures sections 94, 96 rigidly together while release of the screw permits separation of the meshing teeth to permit rotation of section 96 to give beveling knife 22 a desired angle of cut. As best shown in FIGURE 1, beveling knife 22 is positioned in a channel 100 in movable cylindrical section 96, any suitable means such as set screw 99 being provided to secure knife 22 in position.

In the operation and use of the device 10, a joint of pipe 12 is first secured in head 15 with rotating means 14 being actuated to rotate pipe 12 about the longitudinal axis thereof. Pipe cutting and beveling device 10 may be hand held, in the same manner as that of prior art pipe cutting devices, but preferably pin 40 of rotating means 14 is inserted into slot 40 of frame 16 to provide supplementary support. Screw 76 of connecting means 24 is adjusted to raise shank 74 to move knife 22 out of contact with pipe 12.

Handle 48 of engaging and holding means 18 is then rotated until wheels 58, 60 engage pipe 12 and press cutting wheel 20 thereagainst. After the cutting operation has begun, the operator rotates screw 76 until beveling knife 22 begins to cut the desired bevel. Handle 48 and screw 76 are appropriately rotated to increase the cut in the wall of conduit 12 and to further the bevel forming operation. Since beveling knife 22 lags cutting wheel 20, it will be seen that the cutting operation is completed shortly before the beveling operation is finished. When the two pipe segments have been severed, screw 76 is tightened until the completed bevel is formed.

It will be readily apparent that cutting wheel 20 and beveling knife 22 should be substantially coplanar and that term as herein utilized includes not only a strictly coplanar situation, but also the situation wherein beveling knife 22 lags cutting wheel 20 a small distance, on the order of about .060 inch. The cutting wheel 20 will form a sharply angled bevel on the end of conduit 12 and a burr will be formed internally of conduit 12. A finished bevel line will be formed by knife 22 which not only provides a fixed predetermined bevel angle of 37°, but appreciably reduces the extent of a burr thus obviating the requirement for internal reaming.

From the foregoing it is now seen that there is herein provided an improved pipe cutting and beveling machine which accomplishes all of the objects of the instant invention and others, including many advantages of great practical utility and commercial importance.

Since many embodiments may be made of the instant invention, and since many modifications may be made of the embodiment hereinbefore shown and described, it is to be understood that the foregoing is to be interpreted merely as illustrative and not in a limiting sense.

I claim:
1. A pipe cutting and beveling device comprising:
a frame;
a cutting wheel rotatably mounted on said frame for juxtaposition relative to a rotating pipe and at one side thereof;
means on said frame engageable with said rotating pipe at an opposed side thereof, said means being operable to force said cutting wheel into said pipe at said one side thereof to effect its severance by cold working the pipe to form an edge having a first bevel;
a beveling knife and means mounting the beveling knife on the frame, said last named means including means selectively adjustable to move said beveling knife in directions perpendicular and parallel to the axis of rotation of said pipe, said beveling knife being substantially coplanar with the cutting wheel and engaging the pipe contemporaneously with the cutting wheel for shaving a bevel on the edge formed by the cutting wheel, the beveling knife being so positioned that the cutting wheel first contacts the pipe.

2. The cutting and beveling device of claim 1 including means for angularly adjusting the beveling knife about an axis parallel to the axis of the rotating pipe.

3. The cutting and beveling device of claim 1 wherein the engaging and holding means includes means for selectively advancing the engaging and holding means toward the rotating pipe to increase the pressure between the pipe and the cutting wheel.

4. The cutting and beveling device of claim 1 wherein the frame is a substantially U-shaped member adapted to be positioned in inverted relation over a rotating pipe, the pipe engaging means is transversely secured to one leg of the frame and the cutting wheel is positioned on the other leg of the frame.

5. The cutting and beveling device of claim 4 wherein the pipe engaging means includes means to move the pipe engaging means toward and away from the cutting wheel to increase the pressure between the pipe and the cutting wheel.

6. The cutting and beveling device of claim 5 further including means adjustably mounting the beveling knife on the frame for movement toward and away from the pipe, the adjusting means includes a first shank mounted in the bight of the U-shaped frame for linear movement toward and away from the pipe.

7. The cutting and beveling device of claim 6 further including means mounting the beveling knife on the adjustable mounting means for movement along a line parallel to the axis of the pipe, the mounting means includes an enlarged head affixed to the first shank for movement therewith and a second shank linearly movably mounted in the enlarged head along a line parallel to the axis of the pipe.

8. The cutting and beveling device of claim 7 further including means for angularly adjusting the beveling knife about an axis parallel to the axis of the rotating pipe, the angling means includes a first member affixed to the second shank for movement therewith, a second rotatable member carrying the beveling knife and means angularly adjustably clamping the rotatable member to the first member.

References Cited
UNITED STATES PATENTS

| | | | |
|---|---|---|---|
| 1,758,521 | 5/1930 | Kerrigan | 82—4 XR |
| 1,983,922 | 12/1934 | Ruppel | 82—4 |
| 2,165,646 | 7/1939 | Moise | 82—4 |
| 3,240,088 | 3/1966 | Samuels | 82—4 |
| 3,247,743 | 4/1966 | Frost | 82—4 |

HARRISON L. HINSON, *Primary Examiner.*